(12) United States Patent  
Joyce

(10) Patent No.: US 6,663,197 B2
(45) Date of Patent: Dec. 16, 2003

(54) VEHICLE BRAKE SYSTEM HAVING ADAPTIVE TORQUE CONTROL

(75) Inventor: John Patrick Joyce, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 10/063,239

(22) Filed: Apr. 2, 2002

(65) Prior Publication Data

US 2003/0184154 A1 Oct. 2, 2003

(51) Int. Cl.[7] ................................................. B60T 8/64
(52) U.S. Cl. ..................... 303/152; 188/156; 188/158; 303/3; 303/20; 303/112; 303/155; 303/177
(58) Field of Search .......................... 303/152, 3, 20, 303/112, 155, 13–15, 177, 199; 701/22; 180/165, 65.1; 188/181 T, 156, 158

(56) References Cited

U.S. PATENT DOCUMENTS

| 4,962,969 A | 10/1990 | Davis ............................ 303/3 |
| 5,358,317 A | 10/1994 | Cikanek ..................... 303/100 |
| 5,511,859 A | 4/1996 | Kade et al. ..................... 303/3 |
| 5,615,933 A | 4/1997 | Kidston et al. ............. 303/152 |
| 5,716,108 A | 2/1998 | Asa et al. ....................... 303/3 |
| 5,839,800 A | 11/1998 | Koga et al. ................. 303/152 |
| 5,997,107 A | 12/1999 | Koga et al. ................. 303/152 |
| 6,070,953 A | 6/2000 | Miyago ...................... 303/152 |
| 6,086,166 A | 7/2000 | Fukasawa .................. 303/152 |
| 6,142,586 A | 11/2000 | Sakai .......................... 303/152 |
| 2003/0080614 A1 * | 5/2003 | Soga .......................... 303/152 |

* cited by examiner

Primary Examiner—Douglas C. Butler
(74) Attorney, Agent, or Firm—Gregory P. Brown

(57) ABSTRACT

A vehicle brake system (10) is provided which compensates for brake pedal feel variation so as to provide for enhanced braking feel to the vehicle operator. The brake system (10) includes a brake command input (10), an accelerometer (22) for sensing longitudinal acceleration of the vehicle, and friction brakes (26) and regenerative brakes (29) for generating braking force to be applied to brakes on the vehicle. The vehicle brake system (10) further includes a controller (12) for detecting a brake torque variation as a function of the sensed acceleration and the brake demand signal. The controllers (12) further adjusts a torque command signal to adjust the amount of braking torque generated by the brakes (26) so as to compensate for brake torque variation.

20 Claims, 2 Drawing Sheets

VEHICLE BRAKE SYSTEM HAVING ADAPTIVE TORQUE CONTROL

BACKGROUND OF INVENTION

The present invention generally relates to vehicle braking and, more particularly, to an adaptive brake control system that compensates for braking variations to provide consistent brake pedal feel to the vehicle operator.

Conventional frictional braking systems installed on automobiles generally employ a brake pedal assembly having a brake pedal coupled to a master cylinder for providing pressurized hydraulic brake fluid to apply friction braking at the wheels of the vehicle. The brake pedal is actuated (depressed) by the vehicle operator to demand an amount of friction braking. Friction braking systems are generally configured to initially provide a consistent brake pedal feel to the vehicle operator such that the amount of friction braking achieved is substantially proportional to the amount of force applied to the brake pedal by the vehicle operator. However, it is generally known that a number of factors may lead to inconsistent brake pedal response. For example, wear in the friction brake pads, brake fade, variations from one brake pedal to another brake pedal in different vehicles, and temperature can influence the brake pedal response, and thus may provide for inconsistent friction braking over time. As a consequence, the vehicle operator may experience inconsistent variations in brake pedal feel.

The inconsistent brake pedal response generally experienced with friction braking can become more significant when combined with regenerative braking, commonly found on electric and hybrid vehicles. Regenerative braking systems are typically combined with friction braking systems to convert kinetic energy to electrical energy for storage in the vehicle battery. Regenerative braking is typically powered by an electric motor, which acts as a generator during braking, coupled to the powertrain to convert the kinetic energy to electrical energy. Regenerative braking may also be performed with other energy storage technologies that convert the kinetic energy of a vehicle into an alternate form of energy. Concepts exist for recovering vehicle kinetic energy and storing it in the form of pressurized hydraulic fluid, rotating flywheels, and magnetic fields maintained by super conducting coils. The proportional amounts of regenerative braking and friction braking is typically determined by the control system and varies depending on a number of factors including vehicle speed, battery charge, and the amount of braking force commanded. As the vehicle brake control system changes the proportional amounts of regenerative braking and friction braking, the inconsistent brake pedal response becomes more significant, since the amount of friction braking exhibiting inconsistent brake pedal response may change quickly between no friction braking and a substantial amount of friction braking. Thus, the inconsistent brake pedal feel becomes more noticeable to the vehicle operator.

Accordingly, it is desirable to provide for a brake control system in a vehicle that adapts and compensates for inconsistent brake pedal response. In particular, it is desirable to provide for a vehicle brake pedal control system for controlling both friction braking and regenerative braking, which compensates for inconsistent brake pedal response experienced in the friction braking, so as to provide more consistent brake pedal feel to the vehicle operator.

SUMMARY OF INVENTION

In accordance with the teachings of the present invention, a vehicle brake system is provided which compensates for brake pedal feel variation so as to provide for enhanced braking feel to the vehicle operator. The brake system includes a brake command input indicative of braking demand requested by a vehicle operator, an accelerometer for sensing longitudinal acceleration of the vehicle, and a brake actuator for generating braking force to be applied to one or more brakes on the vehicle. The vehicle brake system further includes a controller for receiving the brake demand signal and the sensed acceleration and detecting a brake torque variation as a function of the sensed longitudinal acceleration and brake demand signal. The controller further adjusts a torque command signal to adjust the amount of braking torque generated by the brake actuator so as to compensate for brake torque variation. According to one aspect of the present invention, the brake actuator includes friction braking and regenerative braking, wherein the amount of friction braking is adjusted to compensate for brake torque variation.

These and other features, advantages and objects of the present invention will be further understood and appreciated by those skilled in the art by reference to the following specification, claims and appended drawings.

BRIEF DESCRIPTION OF DRAWINGS

The present invention will now be described, by way of example, with reference to the accompanying drawings.

DETAILED DESCRIPTION

Figure 1:
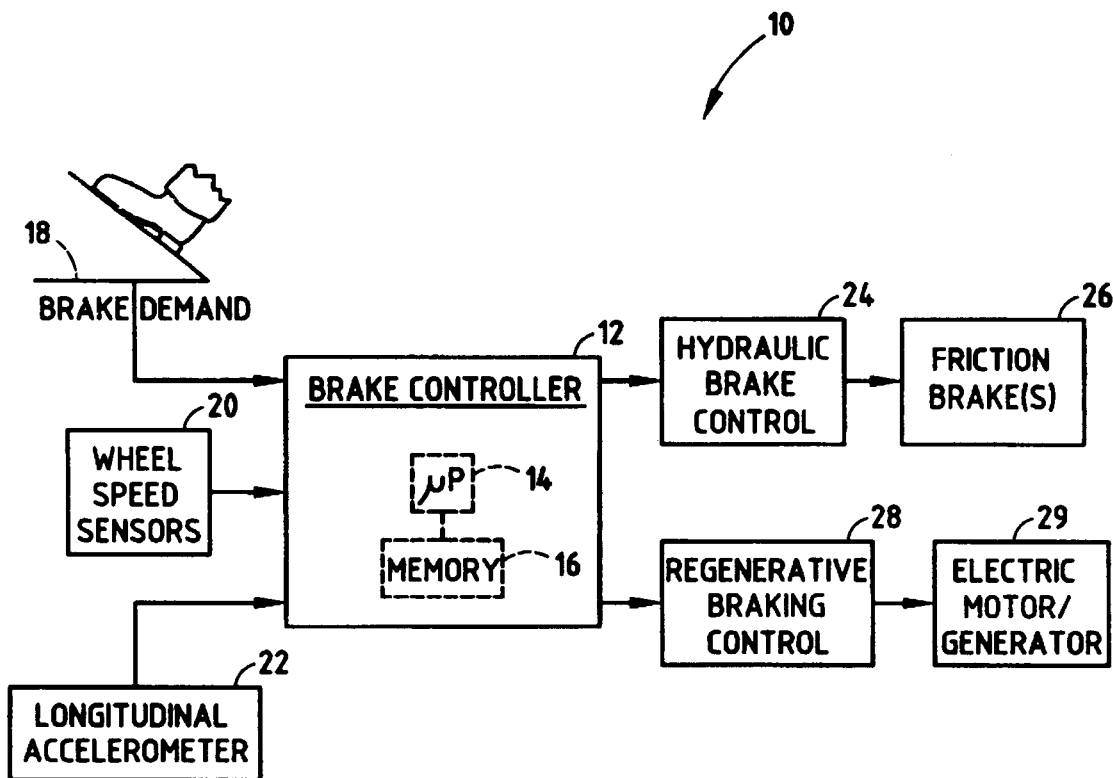
FIG. 1 is a block diagram illustrating a brake system for a vehicle.

Referring to FIG. 1, a brake system 10 is generally shown for an electric vehicle having regenerative braking and hydraulic friction braking. The brake system 10 according to the present invention employs controls to determine variation in the brake torque and compensate for such brake torque variation so as to provide for consistent braking feel to the vehicle operator. The present invention is shown and described in connection with the combination of hydraulic friction braking and regenerative braking, typically employed in electric and hybrid vehicles. However, it should be appreciated that the adaptive torque control for compensating for brake torque variations according to the present invention may be employed for friction brake systems alone, or for the combination of friction braking and regenerative braking.

The brake system 10 includes a brake controller 12 for controlling the overall braking operation, including detecting variation in brake torque and compensating for such brake torque variation, according to the present invention. The brake controller 12 preferably includes a microprocessor 14 and memory 16 for storing and processing brake control routines, including the routine for detecting and compensating for inconsistent brake torque variation as described herein. The brake controller 12 may include a commercially available controller capable of processing one or more brake control routines and storing data related thereto, as should be evident to those skilled in the art.

The brake controller 12 receives a brake demand signal from a brake pedal 14, speed signals from wheel speed sensors 20 associated with various vehicle wheels, and an acceleration signal from a longitudinal accelerometer 22. The brake pedal 18 is shown as a conventional foot pedal that is actuated by the operator (driver) of the vehicle to demand an amount of braking torque based on the driver applied force. The brake demand signal may include a sensed pressure, typically generated in a master cylinder, and/or a pedal stroke travel distance indicative of the travel distance of the brake pedal 18. The use of sensed pressure and/or distance is well-known in the braking art as indications of the amount of braking effort requested by the vehicle operator for controlling frictional braking of a vehicle. The wheel speed sensors 20 may include conventional rotary speed sensors mounted in the vehicle wheels for measuring the rotational speed of each corresponding wheel. The longitudinal accelerometer 22 may include an inertial accelerometer oriented to measure acceleration of the vehicle along its longitudinal (i.e., rear-to-front) axis.

Also shown in the brake system 10 is a hydraulic brake control 24, which may include a conventional master cylinder for generating pressurized hydraulic brake fluid, as is commonly known in the vehicle brake art. The hydraulic brake control 24 communicates with friction brakes 26 to control the amount of friction braking. Friction brakes 26 are generally configured to provide friction braking to brake a corresponding wheel on the vehicle in response to the hydraulic fluid pressure generated by the hydraulic brake control 24. Each of friction brakes 26 may include conventional brake assemblies made up of calipers/cylinders and brake pads as is commonly known in the vehicle brake art.

Further shown in the brake system 10 is a regenerative braking control 28 for controlling the regenerative braking of the vehicle. Regenerative braking control 28 controls the operation of an electric motor/generator 29, which is coupled to the vehicle powertrain according to one embodiment. Regenerative braking systems are well-known for use in electric and hybrid vehicles for braking the vehicle via the electric motor/generator 29 and converting the kinetic energy during braking to electrical energy for storage in the vehicle battery (not shown). The electric motor/generator 29 thus operates as an electrical generator during the regenerative braking operation. The brake controller 12 controls the proportional amounts of regenerative braking and friction braking. Generally, the proportion amount of regenerative braking depends on the amount of braking force commanded, the vehicle speed, battery charge, and other factors. In considering these factors, the brake controller 12 will determine the proportion of friction braking and regenerative braking to be applied during a given braking situation. The determined sum total of friction braking and regenerative braking should equal the total braking demanded by the vehicle operator.

Figure 2:
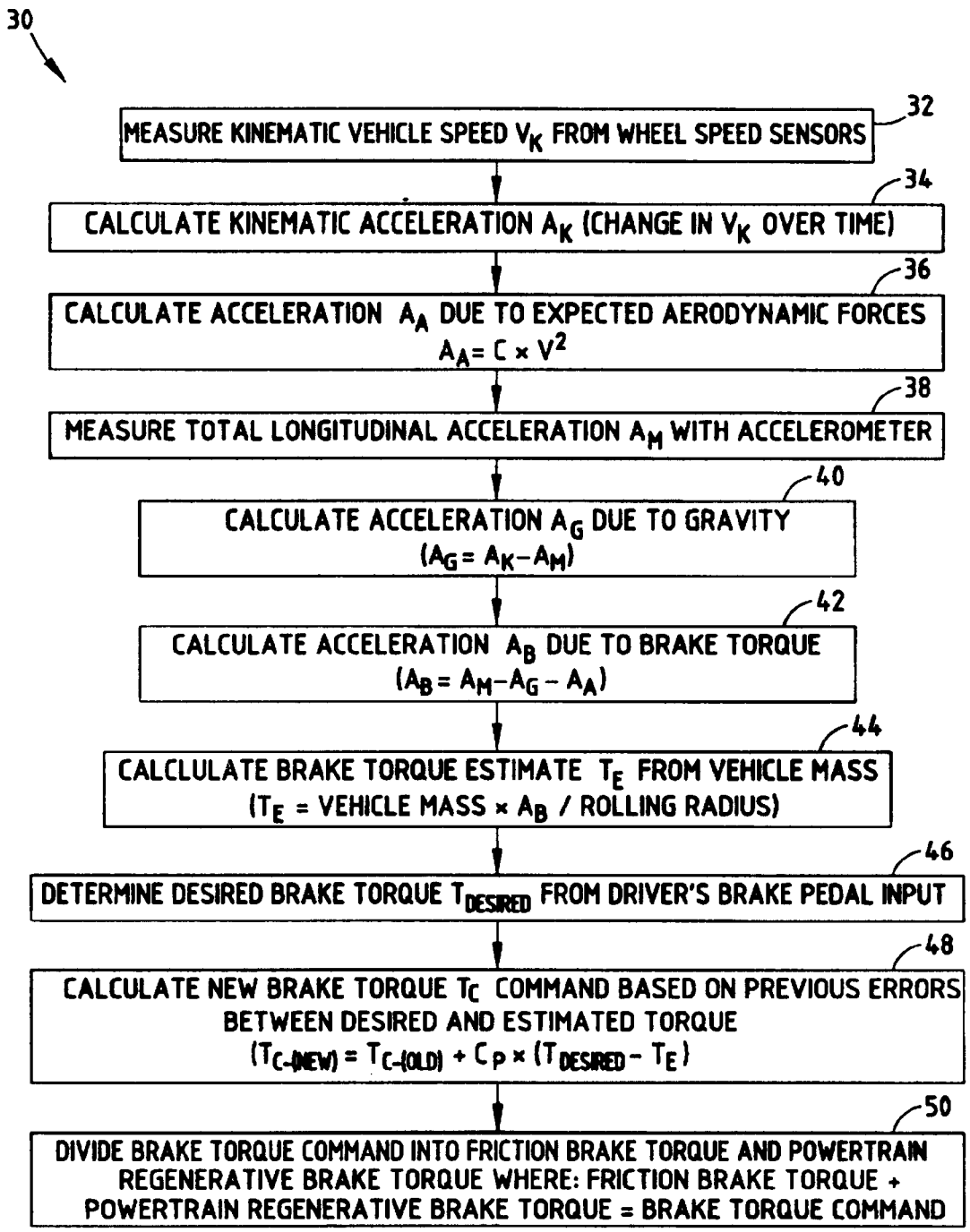
FIG. 2 is a flow diagram illustrating a method of detecting and compensating for inconsistent brake torque variations in the brake system, according to the present invention.

Referring to FIG. 2, a brake control methodology 30 is shown for detecting brake torque variation in a motor vehicle and compensating for such variation to provide a more consistent vehicle braking feel. Various disturbances can cause brake torque variations leading to inconsistent brake feel during braking, including changes in brake effectiveness, vehicle loading, head winds, blending of powertrain torque with friction torque during regenerative braking, etc. The influence of these factors can appear to a driver as random variations that are not expected. The brake control methodology 30 helps to improve driver confidence, control, and comfort, and also helps prevent drivers from having to significantly alter their driving behavior when switching from one vehicle to another, so that the vehicle braking feel is consistent.

The brake control methodology 30 includes step 32 of measuring kinetic vehicle speed $V_K$ as a function of wheel speed signals sensed via the wheel speed sensors. Next, in step 34, the vehicle kinetic acceleration $A_K$ is calculated based on the change (derivative) in measured kinetic vehicle speed $V_K$ over time. An aerodynamic induced acceleration $A_A$ is then calculated in step 36 due to expected aerodynamic forces of the vehicle, according to one embodiment. The aerodynamic induced acceleration $A_A$ is calculated as a function of a known constant C of the vehicle multiplied by the vehicle velocity squared ($V^2$). The value of constant C for a particular vehicle is a known parameter that may be calculated as a function of the product of one-half the known vehicle coefficient of drag multiplied by the front area of the vehicle and the density of air. While the calculated aerodynamic induced acceleration $A_A$ is used to compensate for aerodynamics, it should be appreciated that other factors may be considered and compensated for including tire and bearing rolling resistance, residual powertrain torque to prevent stall or provide desired accelerator pedal response and powertrain torque commanded by the driver during braking by simultaneous activation of both the brake pedal and the accelerator pedal.

Proceeding to step 38, brake control methodology 30 measures the total longitudinal acceleration $A_M$ of the vehicle with the longitudinal accelerometer. The measured acceleration $A_M$ provides a signal indicative of the longitudinal acceleration of the vehicle. Next, in step 40, the acceleration $A_G$ due to gravity is calculated. Acceleration $A_G$ due to gravity may be calculated as a function of the difference between the calculated kinetic acceleration $A_K$ and the measured total acceleration $A_M$. In step 42, a brake torque acceleration $A_B$ is calculated due to the brake torque by subtracting the aerodynamic induced acceleration $A_A$ and the acceleration $A_G$ due to gravity from the measured total acceleration $A_M$. The brake torque acceleration $A_B$ provides an approximate indication of the total vehicle acceleration due to the vehicle brakes.

Proceeding to step 44, an estimated brake torque $T_E$ is calculated based on the vehicle mass multiplied by the brake torque acceleration $A_B$ and divided by the radius of the vehicle tire and wheel assembly (rolling radius). The vehicle mass and the radius of the tire and wheel assembly may be approximated from constants or estimated by other known approaches. The estimated brake torque provides an indication of the total brake torque applied by the friction and regenerative braking.

Brake control methodology 30 includes step 46 of determining a desired brake torque $T_{DESIRED}$ from the driver brake pedal input. The desired brake torque $T_{DESIRED}$ is a brake demand signal indicative of the vehicle operator commanded braking. The desired brake torque $T_{DESIRED}$ is typically obtained as a non-linear function of pedal force and/or pedal travel, as is well-known in the vehicle brake art. Next, in step 48, a new brake torque command $T_C$ signal is calculated based on previous errors between the desired brake torque $T_{DESIRED}$ and the estimated brake torque $T_E$. The new brake torque command $T_C$ may be calculated based on the previous calculated brake torque command $T_C$ summed with the product of a constant or proportional feedback control $C_P$ multiplied by the torque error (i.e., $T_{DESIRED}-T_E$). The new brake torque command $T_C$, therefore, provides a brake command signal indicative of the amount of torque needed to compensate for brake torque variations and provide a consistent braking feel for the vehicle operator. After a series of brake torque commands $T_C$ are issued, the error ($T_{DESIRED}-T_E$) reaches a value of zero. Thus, the brake torque command signal is adjusted to compensate for variation in brake torque, so as to provide for a more consistent brake pedal feel for the vehicle operator, despite the presence of one or more brake torque variations. It should be appreciated that other functions for modifying the brake torque command based on the error may be employed without departing from the teachings of the present invention. The exact design of the function may employ any of a wide variety of approaches which are common in control systems design, including, but not limited to integral control, proportional control, and derivative control.

Finally, in step 50, brake control methodology 30 divides the brake torque command into friction brake torque and powertrain regenerative brake torque, in accordance with well-known distributions of braking force for regenerative and friction braking systems. It should be appreciated that the sum total of friction brake torque and the powertrain regenerative brake torque should equal the brake torque command. The proportion of regenerative braking and friction braking, may be varied according to well-known approaches based on vehicle speed, the amount of energy stored in the battery, the amount of braking force requested, and other characteristics.

Accordingly, the brake system 10 and brake control methodology 30 of the present invention advantageously determines brake torque variation in a vehicle and compensates for such brake torque variation to provide a more consistent brake pedal feel for the vehicle operator. The brake torque variation compensation may be applied to a friction braking system to provide for enhanced feel. However, compensation of brake torque variation in vehicles employing both regenerative braking and friction braking provides a more noticeable compensation to the brake torque variation.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A vehicle brake system comprising:
    a brake demand input;
    an accelerometer for sensing longitudinal acceleration of a vehicle;
    a brake actuator for generating braking force to be applied to one or more
    brakes on the vehicle; and
    a controller for receiving the brake demand signal and the sensed acceleration and detecting a brake torque variation as a function of the sensed acceleration and brake demand signal, said controller further adjusting a torque command signal to adjust the amount of braking torque generated by the brake actuator so as to compensate for the brake torque variation.

2. The brake system as defined in claim 1, wherein the brake actuator comprises a friction brake actuator.

3. The brake system as defined in claim 2, wherein said brake actuator further comprises a regenerative brake, wherein the amount of braking force is proportioned between the friction brake actuator and the regenerative brake.

4. The brake system as defined in claim 1 further comprising a wheel speed sensor for sensing vehicle wheel speed, wherein the controller calculates a kinetic acceleration of the vehicle as a function of the sensed wheel speed.

5. The brake system as defined in claim 4, wherein the controller calculates acceleration of the vehicle due to brake torque as a function of the sensed acceleration and the calculated kinetic acceleration, and further estimates brake torque as a function of the calculated acceleration.

6. The brake system as defined in claim 5 further comprising calculating an expected aerodynamic induced acceleration, said controller estimating the brake torque further as a function of the expected aerodynamic induced acceleration.

7. The brake system as defined in claim 5, wherein said controller determines a desired brake torque as a function of the brake demand input and determines a torque error as the difference between the desired torque and the estimated brake torque, said controller further modifying the torque command signal to compensate for the torque error.

8. A vehicle brake system comprising:
    a brake demand input;
    an accelerometer for sensing longitudinal acceleration of a vehicle;
    a frictional brake actuator for providing friction braking;
    a regenerative brake actuator for providing regenerative braking of the vehicle; and
    a controller for receiving the brake demand input and the sensed acceleration and detecting a brake torque variation as a function of the sensed acceleration and the brake demand input, said controller further adjusting a torque command signal to adjust the amount of braking torque generated by the brake friction actuator so as to compensate for the brake torque variation.

9. The brake system as defined in claim 8, wherein said controller controls a proportional amount of friction braking and regenerative braking.

10. The brake system as defined in claim 8 further comprising a wheel speed sensor for sensing vehicle wheel speed, wherein the controller calculates the kinetic acceleration as a function of the sensed wheel speed.

11. The brake system as defined in claim 8, wherein the controller calculates acceleration of the vehicle due to brake torque as a function of the sensed acceleration and the calculated kinematic acceleration, and further estimates brake torque as a function of the calculated acceleration.

12. The brake system as defined in claim 11, wherein the controller further calculates an expected aerodynamic induced acceleration, said controller estimating the brake torque further as a function of the expected aerodynamic induced acceleration.

13. The brake system as defined in claim 11, wherein said controller determines a desired brake torque as a function of the brake demand input and determines a torque error as the difference between the desired torque and the estimated brake torque, said controller further modifying the torque command signal to compensate for the torque error.

14. A method of controlling a brake system in a vehicle to compensate for brake torque variation, said method comprising the steps of:
    receiving a brake demand signal;
    sensing longitudinal acceleration of a vehicle;
    generating braking force to be applied to one or more brakes on the vehicle;
    detecting a brake torque variation as a function of the sensed acceleration and brake demand signal; and
    adjusting a torque command signal to adjust the amount of braking torque generated so as to compensate for the brake torque variation.

15. The method as defined in claim 14, wherein the step of generating braking force comprises generating braking force applied by a friction brake actuator.

16. The method as defined in claim 15, wherein the step of generating braking force further comprises generating braking force by a regenerative brake.

17. The method as defined in claim 14 further comprising the steps of:
   sensing vehicle wheel speed; and
   calculating a kinematic acceleration as a function of the sensed wheel speed.

18. The method as defined in claim 14 further comprising the steps of:
   calculating acceleration of the vehicle due to brake torque as a function of the sensed acceleration and the calculated kinematic acceleration; and
   estimating brake torque as a function of the calculated acceleration.

19. The method as defined in claim 18 further comprising the steps of:
   calculating an expected aerodynamic induced acceleration; and
   estimating the brake torque further as a function of the expected aerodynamic induced acceleration.

20. The method as defined in claim 18 further comprising the steps of:
   determining a desired brake torque as a function of the brake demand input;
   determining a torque error as the difference between the desired torque and the estimated brake torque; and
   modifying the torque command signal to compensate for the torque error.

* * * * *